United States Patent
Yasooka

(10) Patent No.: US 9,905,820 B2
(45) Date of Patent: Feb. 27, 2018

(54) BATTERY CELL STORAGE APPARATUS AND STORAGE APPARATUS TRANSPORT SYSTEM

(71) Applicants: Nissan Motor Co., Ltd., Yokohama-shi, Kanagawa (JP); Automotive Energy Supply Corporation, Zama-shi, Kanagawa (JP)

(72) Inventor: Takeshi Yasooka, Yamato (JP)

(73) Assignees: Nissan Motor Co., Ltd., Yokohama (JP); Automotive Energy Supply Corporation, Zama (JP)

( * ) Notice: Subject to any disclaimer, the term of this patent is extended or adjusted under 35 U.S.C. 154(b) by 128 days.

(21) Appl. No.: 14/371,237

(22) PCT Filed: Feb. 13, 2013

(86) PCT No.: PCT/JP2013/053382
§ 371 (c)(1),
(2) Date: Jul. 9, 2014

(87) PCT Pub. No.: WO2013/122098
PCT Pub. Date: Aug. 22, 2013

(65) Prior Publication Data
US 2014/0356676 A1 Dec. 4, 2014

(30) Foreign Application Priority Data

Feb. 13, 2012 (JP) .................................. 2012-028539

(51) Int. Cl.
*H01M 2/10* (2006.01)

(52) U.S. Cl.
CPC ....... *H01M 2/1005* (2013.01); *H01M 2/1016* (2013.01); *H01M 2/1061* (2013.01)

(58) Field of Classification Search
CPC . H01M 2/1005; H01M 2/1016; H01M 2/1061
USPC ........................... 429/152–154, 163, 96–100
See application file for complete search history.

(56) References Cited

U.S. PATENT DOCUMENTS 6,087,036 A * 7/2000 Rouillard .............. H01M 2/202
429/120

FOREIGN PATENT DOCUMENTS

| CN | 102301503 A | 12/2011 |
|---|---|---|
| EP | 0561069 A1 | 9/1993 |
| JP | 7-183357 A | 7/1995 |
| JP | 2002-151156 A | 5/2002 |

(Continued)

*Primary Examiner* — James Lee
(74) *Attorney, Agent, or Firm* — Global IP Counselors, LLP

(57) ABSTRACT

A battery cell storage apparatus includes a plurality of sheet-formed middle plates, a plurality of middle plate holding members and a fixing member. The plurality of sheet-formed middle plates are aligned so as to store flat cells therebetween. The plurality of middle plate holding members are aligned in a direction of alignment of the sheet-formed middle plates, and each sheet-formed middle plate holding member of the plurality of middle plate holding members holding a respective sheet-formed middle plate of the plurality of sheet-formed middle plates in a direction perpendicular to the direction of alignment. The fixing member is configured to fix the flat cells stored between the sheet-formed middle plates by sandwiching the flat cells together with the sheet-formed middle plates.

13 Claims, 13 Drawing Sheets

(56) References Cited

FOREIGN PATENT DOCUMENTS

| | | | |
|---|---|---|---|
| JP | 2003-142057 A | 5/2003 | |
| JP | 2005-150055 A | 6/2005 | |
| JP | 2008-300288 | * 12/2008 | ............. H01M 2/10 |
| JP | 2010-153275 A | 7/2010 | |
| JP | 2011-34821 A | 2/2011 | |
| JP | 2012-3950 A | 1/2012 | |
| KR | 20110137740 A | 12/2011 | |
| WO | 98/16964 A1 | 4/1998 | |

* cited by examiner (OPEN POSITION)

(COMPRESSED POSITION)

(INTERMEDIATE POSITION)

BATTERY CELL STORAGE APPARATUS AND STORAGE APPARATUS TRANSPORT SYSTEM

CROSS-REFERENCE TO RELATED APPLICATIONS

This application is a U.S. National stage application of International Application No. PCT/JP2013/053382, filed Feb. 13, 2013, which claims priority to Japanese Patent Application No. Japanese Patent Application 2012-28539 filed in Japan on Feb. 13, 2012, the contents of each of which are hereby incorporated herein by reference.

BACKGROUND

Field of the Invention

The present invention relates to a battery cell storage apparatus.

Background Information

Conventional systems are known in which plurality of workpieces are stored in a rack, and the pitch of the plurality of workpieces that are aligned in the rack is adjusted in accordance with the workpiece treatment step (for example, refer to Japanese Laid-Open Patent Application No. 7-183357). With the invention according to Japanese Laid-Open Patent Application No. 7-183357, the workpieces are substrates, and the workpieces are held in grooves that are formed in substrate holding members in which the ends of the substrates fit.

With steps that involve processing cells, plurality of cells are stored in the rack and are taken out and transported after adjusting the pitch as necessary.

SUMMARY

However, with cells, for example, the external packaging is formed from a laminate that is produced by coating an aluminum sheet with resin, and so the ends of the external packaging are not as hard as the substrates. Consequently, when the method according to Japanese Laid-Open Patent Application No. 7-183357 is used and a battery cell is fit into a groove in a holding member, there is the possibility of damage to the ends of the battery cell.

The present invention was developed in light of such circumstances, and an objective of the invention is to provide a battery cell storage apparatus and storage apparatus transport system whereby cells can be stored without damage to the ends of the cells.

A battery cell storage apparatus has a plurality of sheet-formed middle plates, a plurality of middle plate holding members, and a fixing member. The plurality of middle plates is aligned so that flat cells can be stored between them. The middle plate holding members are aligned along the direction in which the middle plates are aligned and hold each of the middle plates from a direction perpendicular to the alignment direction. The fixing member allows the cells that have been stored between the middle plates to be fixed by being sandwiched together with the middle plates.

Because the cells can be disposed in between the plates, the flat faces of the flat cells can be supported on the middle plates. By supporting the cells from the flat faces, load on the ends of the external packaging of the cells can be reduced, preventing damage to the ends of the cells.

BRIEF DESCRIPTION OF THE DRAWINGS

Referring now to the attached drawings which form a part of this original disclosure.

DETAILED DESCRIPTION OF THE EMBODIMENTS

Figure 1:
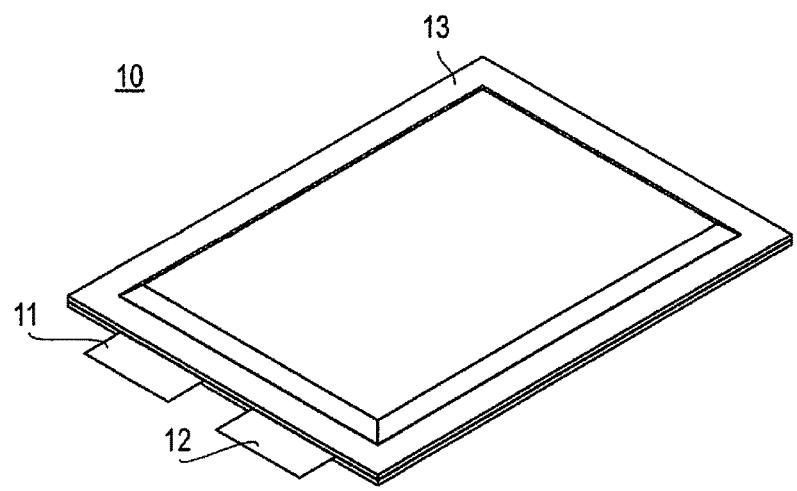
FIG. 1 is a perspective view showing the exterior of the battery cell.

Embodiments of the present invention are described below with reference to the accompanying drawings. In the descriptions of the drawings, the same symbols refer to the same elements, and duplicate descriptions are thus not made. The dimensional ratios in the drawings may be exaggerated in order to aid in description and thus may differ from the true ratios in some instances.

The present invention relates to a battery cell storage apparatus for storing cells and a storage apparatus transport system for transporting the battery cell storage apparatus. The structure of a battery that is to be stored will be described prior to describing the battery cell storage apparatus and the storage apparatus transport system.

(Battery)

FIG. 1 is an perspective view showing the exterior of a battery cell.

As shown in FIG. 1, the battery cell 10 has a flat rectangular shape wherein a positive electrode lead 11 and a negative electrode lead 12 exit from the same end of an external packaging 13. The external packaging 13, for example, is produced by coating the surfaces of aluminum sheets with resin.

An electrolyte and an electricity-generating element (battery element) in which the charging and discharging reactions occur are contained inside the external packaging 13. The electricity-generating element is formed by alternatingly layering positive electrodes and negative electrodes, with sheet-form separators interposed between them. The positive electrode lead 11 and the negative electrode lead 12 are connected to the positive electrodes and negative electrodes of the battery element.

With the electricity-generating element disposed in the external packaging and electrolyte having been added, or with initial charging having been carried out, there are cases in which air, gas, or the like is retained inside the battery element (separator). The air or gas that is retained inside the battery element is pressed out from inside the battery element by pressing the battery cell 10 with rollers.

Figure 2:
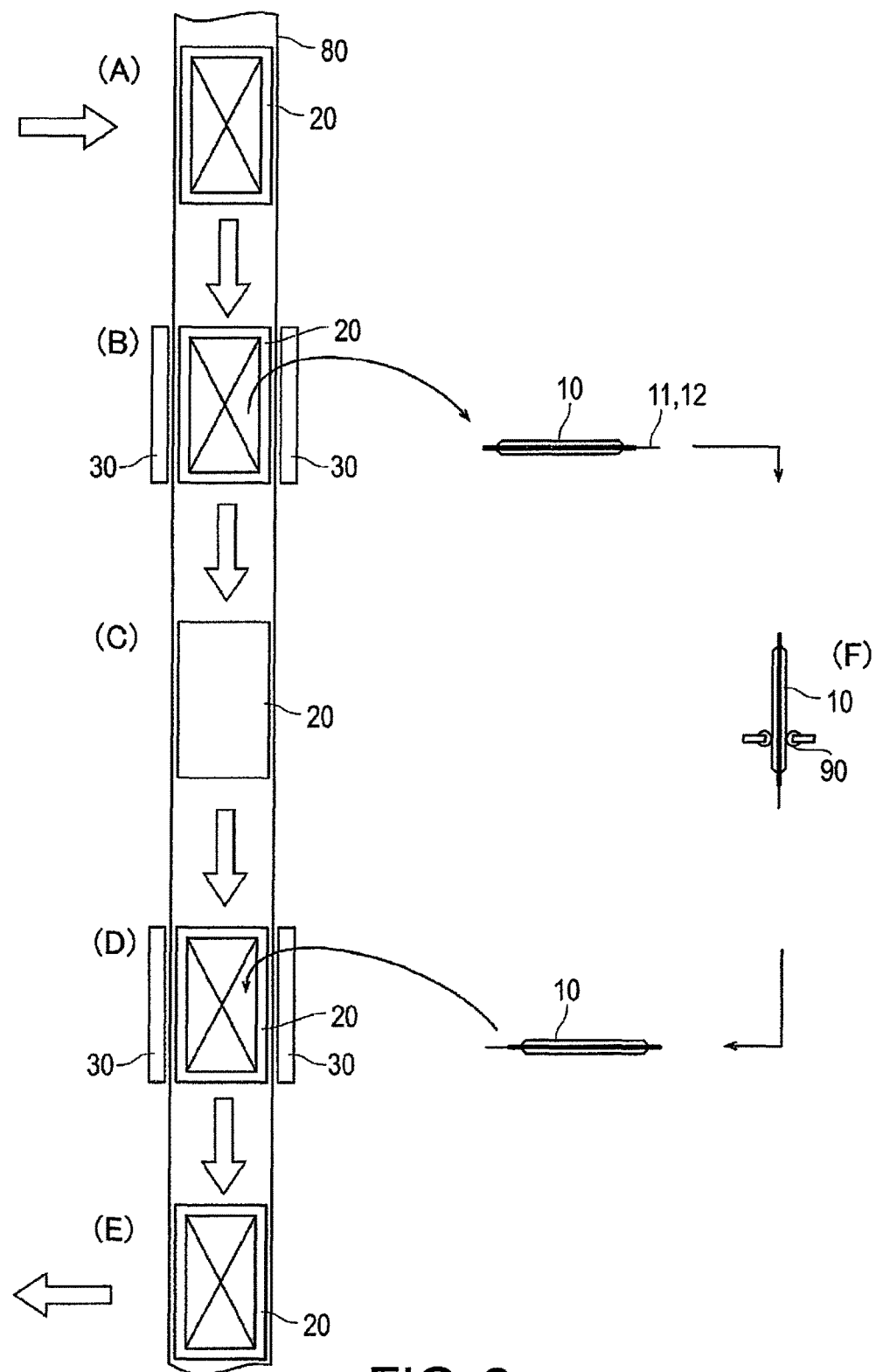
FIG. 2 is a plan view showing an example of the processing steps in which the battery cell storage apparatus is used.

FIG. 2 is a plan view showing an example of the processing steps in which the battery cell storage apparatus is used. In FIG. 2, the battery cell storage apparatus 20 is simplified, and the detailed configuration is described below.

The battery cell storage apparatus 20 can transport cells 10 for each step while storing plurality of cells 10. In FIG. 2, the battery cell storage apparatus 20 is transported to steps (A) to (E) in the sequence indicated by the white arrows. Transport of the battery cell storage apparatus 20 is carried out by the transport apparatus 80. The transport apparatus 80, for example, is a transport conveyor that operates while carrying the battery cell storage apparatus 20. In step (A), the battery cell storage apparatus 20 in which cells 10 are stored is transported in from a prior step not shown in the drawing.

The battery cell storage apparatus 20 is transported to step (B) with the cells 10 stored therein. In step (B), the fixing of the cells 10 by the battery cell storage apparatus 20 is released, and the cells 10 are removed from the battery cell storage apparatus 20. In step (B), the middle plate positioning apparatus 30 that positions the middle plates in the battery cell storage apparatus 20 is on standby. When the battery cell storage apparatus 20 is transported in, the middle plate positioning apparatus 30 is connected to the battery cell storage apparatus 20. The middle plate positioning apparatus 30 opens the gaps between the plurality of middle plates that have been fixed while sandwiching the cells 10 in the battery cell storage apparatus 20, allowing the cells 10 to be removed. The details are described below. Removal of the cells 10 is carried out by a robot or the like.

The battery cell storage apparatus 20 from which all of the cells 10 have been removed in step (B) is then transported to step (D) through step (C) while empty and without being connected to the middle plate positioning apparatus 30. During the period when the battery cell storage apparatus 20 is transported to step (D), the cells 10 are roller-pressed in step (F). In roller-pressing, the rollers 90 press both flat faces of the flat cells 10, thereby pressing the battery elements (D) in the cells 10 in the layering direction. As a result, the air or gas inside the battery elements is discharged from the battery elements inside the external packaging 13. Upon completion of roller-pressing, the cells 10 are again stored in the battery cell storage apparatus 20 which is on stand-by in step (D).

In step (D), the middle plate positioning apparatus 30 is placed on standby, and the middle plate positioning apparatus 30 is connected to the battery cell storage apparatus 20. The middle plate positioning apparatus 30 opens the middle plates for storage of the cells 10. When all of the cells 10 are stored in the battery cell storage apparatus 20, the battery cell storage apparatus 20 fixes the cells 10 by positioning of the middle plates in the battery cell storage apparatus 20 using the middle plate positioning apparatus 30. The battery cell storage apparatus 20 is transported to step (E) without being connected to the middle plate positioning apparatus 30.

(Battery Cell Storage Apparatus)

The detailed configuration of the battery cell storage apparatus 20 is described below.

Figure 3:
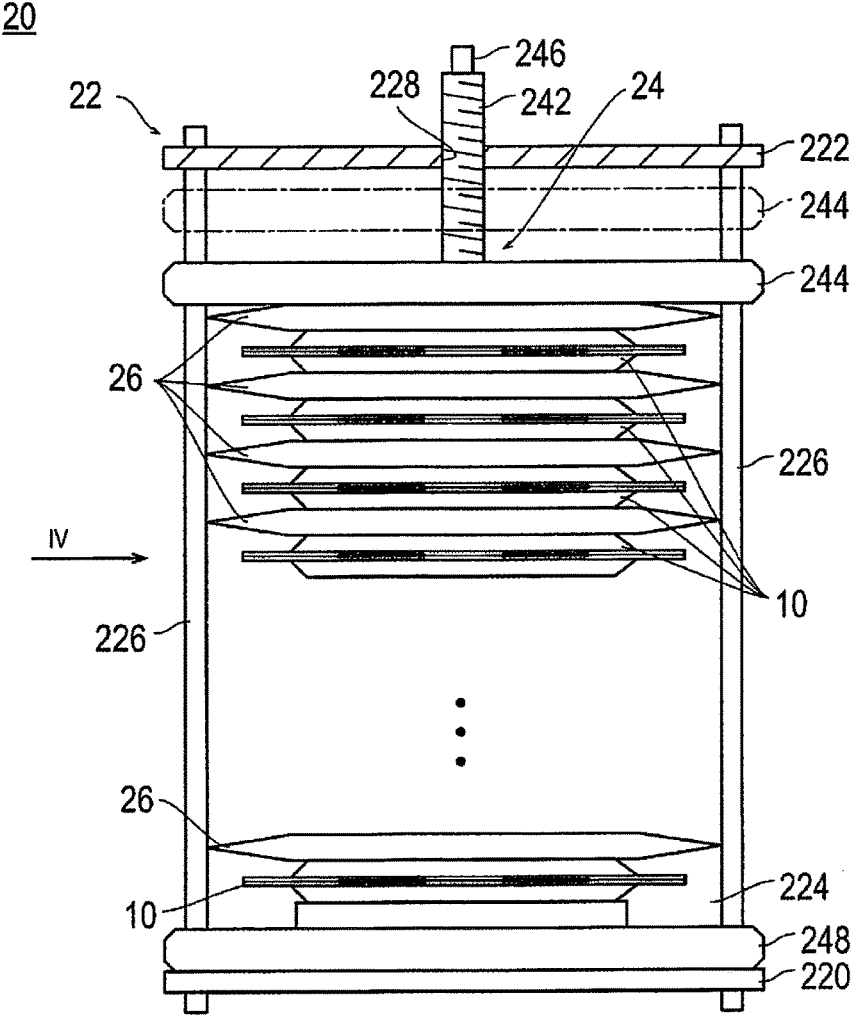
FIG. 3 is a plan view showing the schematic configuration of the battery cell storage apparatus.
Figure 4:
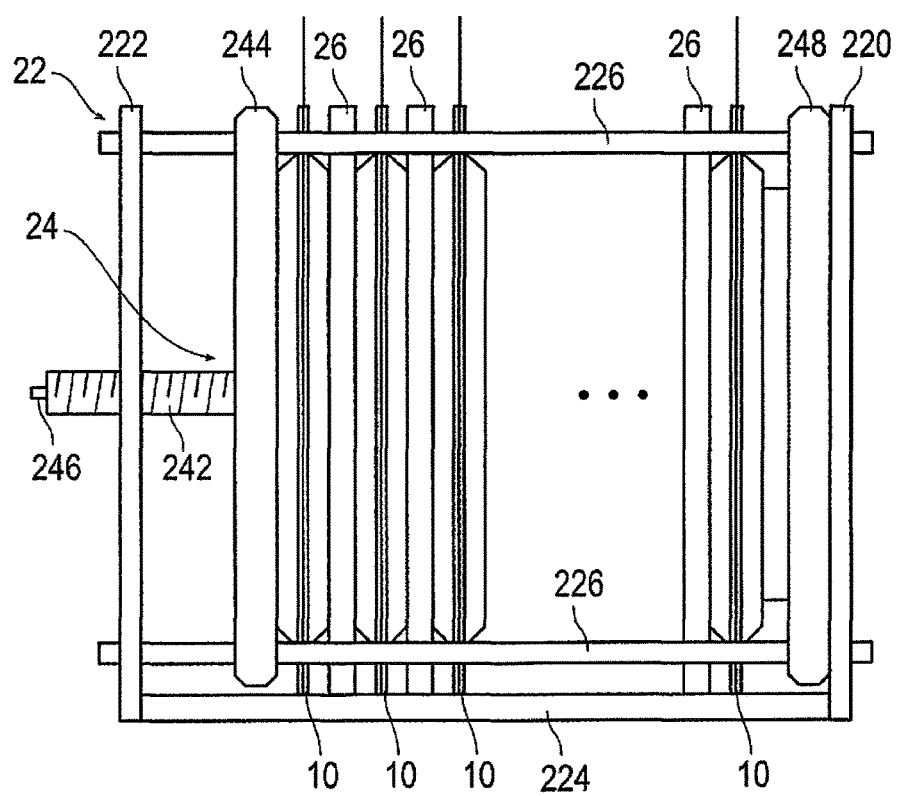
FIG. 4 is a side view of the battery cell storage apparatus as seen from the direction of the arrow IV in FIG. 3

FIG. 3 is a plan view showing the schematic configuration of the battery cell storage apparatus, and FIG. 4 is a side view of the battery cell storage apparatus as seen from the direction of the arrow IV in FIG. 3.

The battery cell storage apparatus 20 has a frame 22, a fixing part 24, and plurality of middle plates 26.

The frame 22 has a side plate 220, a side plate 222, a bottom plate 224, and through-rods 226. The side plate 220 and the side plate 222 are rectangular plates and are provided upright as side walls for the battery cell storage apparatus 20. The side plate 220 and side plate 222 have a bottom plate 224 fixed at their bottoms. The battery cell storage apparatus 20 is formed in the shape of a box, with the side plate 220, the side plate 222, and the bottom plate 224 encompassing three faces in the form of plates, and the remaining three faces being open. The through-rods 226 are four rods which link the opposing four corners of the side plate 220 and the side plate 222. In other words, the through-rods 226 constitute the four edges of the box form of the battery cell storage apparatus 20, extending from the side plate 220 to the side plate 222.

FIG. 3 shows the sectional shape resulting from sectioning through the middle of the side plate 222. A hole 228 through which the fixing part 24 inserts is formed in the center of the side plate 222. The hole 228 has internal threading, which threads together with the fixing part 24.

The fixing part 24 has a thread part 242 and a moving plate 244. The thread part 242 has threading on its surface that threads together with the hole 228 of the side plate 222. A linking part 246 that can link with the moving plate positioning apparatus described below is formed on one end of the thread part 242. A moving plate 244 is attached to the other end of the thread part 242. The moving plate 244 moves towards or away from the middle plates 26 in accordance with advancement or retraction of the thread part 242. The moving plate 244 has the through-rods 226 inserting therethrough at the four corners and is attached to the thread part 242 so as to be capable of moving parallel without itself rotating as a result of rotation of the thread part 242. The fixing part 24 may also comprise a fixing plate 248 that is fixed so the frame 22 is in a state of opposing the moving plate 244. The fixing part 24 sandwiches the cells 10 that are stored in between the middle plates 26 along with the middle plates 26, thereby fixing the cells 10 inside the battery cell storage apparatus 20.

The middle plates 26 are plate-form members that are disposed in the box form produced by the frame 22. The middle plates 26 are aligned parallel to each other so that the flat cells 10 can be stored between them. The plurality of middle plates 26 are supported against each other standing on the bottom plate 224 of the frame 22, when cells 10 are not stored. The middle plates 26 do not fall out of the frame 22 because their transverse location is restricted by the through-rods 226. The plurality of middle plates 26 are pressed by the moving plate 244 when the cells 10 are stored, thereby being pressed onto or impinging upon the cells 10 between them.

The middle plate positioning apparatus 30 and the moving plate positioning apparatus 40 that support the function of the battery cell storage apparatus 20 in step (B) and step (D) described above are described with reference to FIG. 5 and FIGS. 6A, 6B and 6C.

Figure 5:
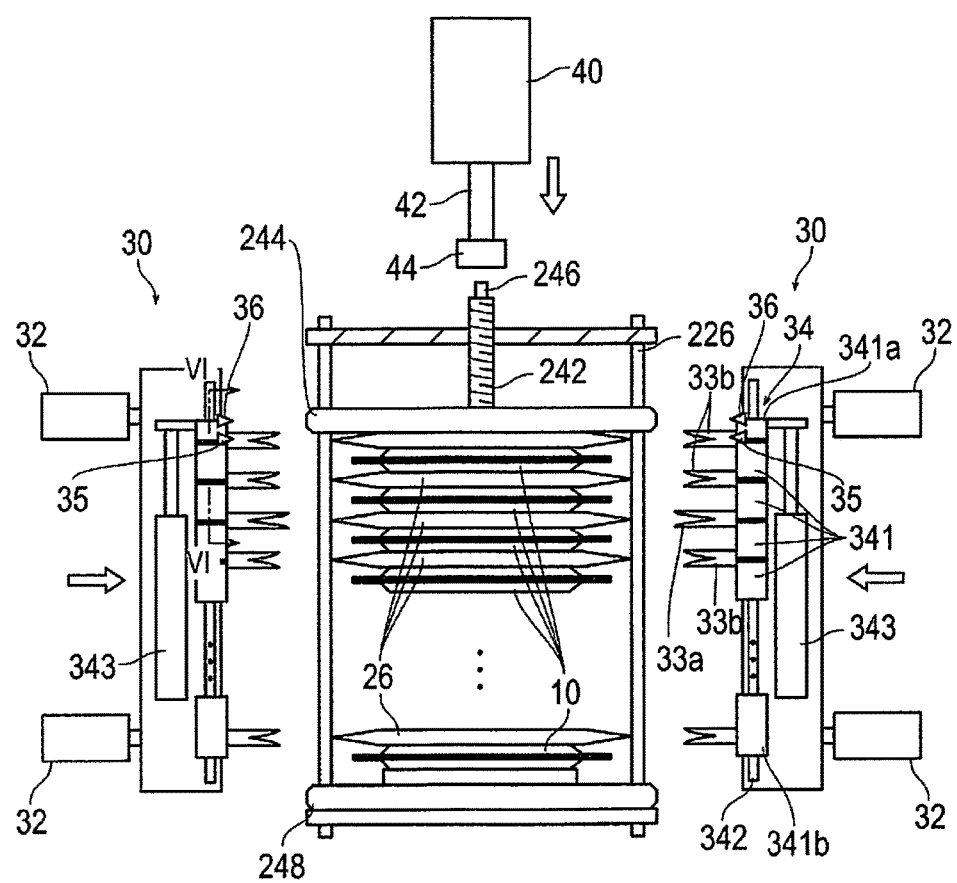
FIG. 5 is a plan view showing the moving plate positioning apparatus and the middle plate positioning apparatus operating in the battery cell storage apparatus.
Figure 6A:
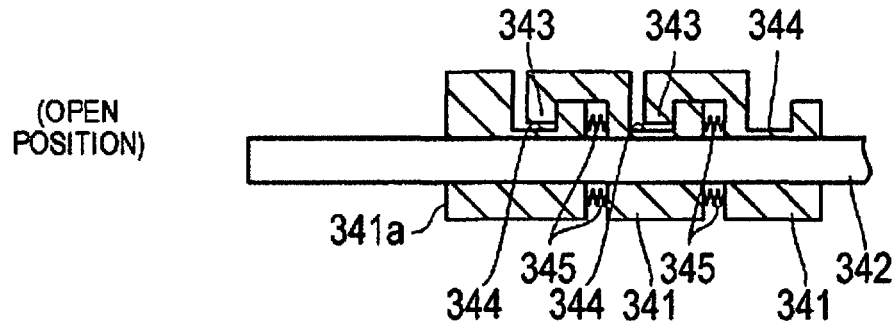
FIGS. 6A, 6B and 6C are a transverse sectional views of the pitch altering part along the line VI-VI in FIG. 5.
Figure 6B:
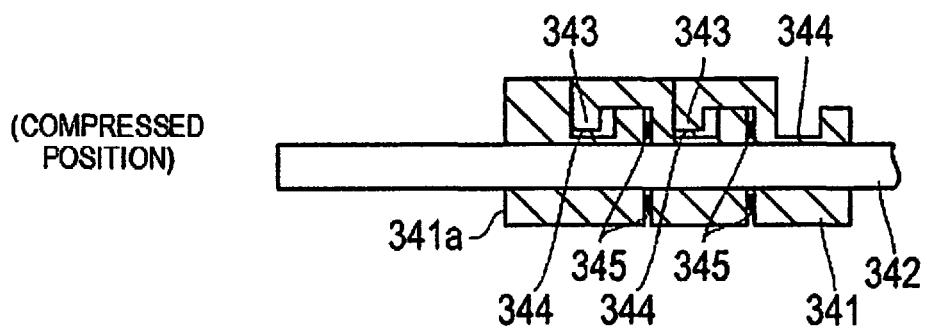
Figure 6C:
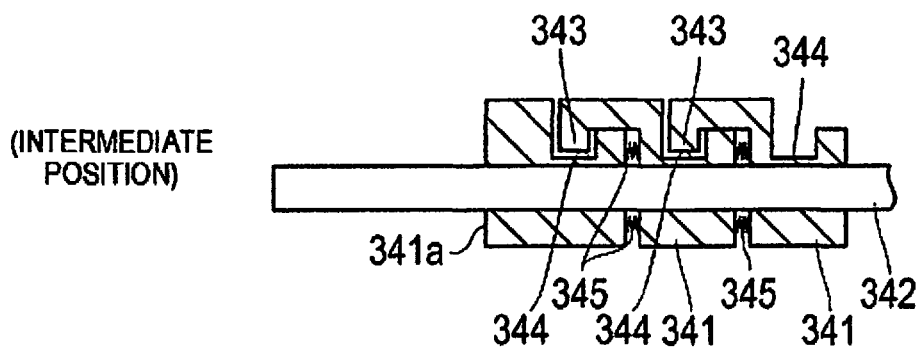

FIG. 5 is a plan view showing the moving plate positioning apparatus and middle plate positioning apparatus that operate in the battery cell storage apparatus. FIGS. 6A, 6B and 6C are transverse sectional views of the pitch altering part along the line VI-VI in FIG. 5.

When the battery cell storage apparatus 20 reaches step (B) and step (D), the middle plate positioning apparatus 30 and the moving plate positioning apparatus 40 connect to the battery cell storage apparatus 20. FIG. 5 shows the elements involved in the battery cell storage apparatus 20 reaching step (B) with the cells 10 stored therein.

The middle plate positioning devices 30 in step (B) and (D) are disposed as a pair on both sides of the battery cell storage apparatus 20. The middle plate positioning devices 30 each has a main body 31, a main body slide part 32, guides 33, a pitch altering part 34, a pressing position sensor 35, and a holding position sensor 36.

The main body 31 supports each structural element. The main body slide part 32 is a cylinder which causes the main body 31 to approach or move away from the cells 10 by advancement or retraction of a shaft.

The guides 33 are aligned in the direction of alignment of the middle plates 26 as a plurality of middle plate holding members that hold the middle plates 26 from a direction that is perpendicular to the direction of alignment. The guides 33 have long guides 33a (first holding members) and short guides 33b (second holding members), with one long guide 33a being provided for several short guides 33b, e.g., one being disposed every two units. With the long guides 33a and short guides 33b, all have gaps that extend towards the middle plates 26, with the ends of the middle plates 26 fitting into the gaps when the middle plate positioning apparatus 30 is connected to the battery cell storage apparatus 20.

The guides 33 are fixed on a pitch altering part 34. The pitch altering part 34 has a plurality of linkage pieces 341, a guide rod 342, and a cylinder 343. The plurality of linkage pieces 341 are provided in the same number as the guides 33, and the guides 33 attach one-to-one. Each of the linkage pieces 341 is linked so that the gaps between them can be altered within a specified range. The guide rod 342 inserts through the linkage pieces 341 in the alignment direction, guiding the linkage pieces 341. The shaft of the cylinder 343 is attached to the end linkage piece 341a.

The cylinder 343, through advancement or retraction of the shaft, adjusts the position of the end linkage piece 341a in the alignment direction of the linkage pieces 341. When the shaft of the cylinder 343 extends, the linkage piece 341a moves along the guide rod 342. The end linkage piece 341b on the opposite side is fixed, and so the intervening linkage pieces 341 between the linkage piece 341a and the linkage piece 341b widen. Conversely, when the shaft of the cylinder 343 retracts, the separation between the linkage pieces 341 decreases. In addition, the cylinder 343 can be made to float freely without restricting the position of the linkage piece 341a.

The structure whereby the linkage pieces 341 are linked is shown in FIGS. 6A, 6B and 6C. The linkage pieces 341 have protrusions 343 and depressions 344 that fit together with adjacent linkage pieces 341. The linkage piece 341a and linkage piece 341b that are disposed at the ends have only a protrusion 343 or a depression 344. The depression 344 of a linkage piece 341 fits together with the protrusion 343 of another linkage piece 341, thereby fixing the linkage pieces 341 to each other.

The depressions 344 are formed larger in the linkage direction of the linkage piece 341 than the protrusions 343. Consequently, as shown in FIGS. 6A, 6B and 6C, the separation between linkage pieces 341 is variable. Because the separation between the linkage pieces 341 is variable, the distance between the guides 33 that are attached to the linkage pieces 341 is also variable.

Springs or other elastic bodies 345 are disposed between the linkage pieces 341. As a result of the elastic bodies 345, equivalent forces act between the linkage pieces 341, and the gaps between the linkage pieces 341 are roughly equivalent. For example, in reference to FIG. 5, when the shaft of the cylinder 343 is maximally extended, the distance between the linkage pieces 341 increases, and, as shown in FIG. 6A, the inner surfaces of the protrusions 343 of the linkage pates 341 contact the inner surfaces of the depressions 344 of the other linkage pieces 341, producing an open position with maximal gaps between the linkage pieces 341. In this case, the gaps between the linkage pieces 341 are roughly equivalent. On the other hand, when the shaft of the cylinder 343 is maximally retracted, the gaps between the linkage pieces 341 narrow, and, as shown in FIG. 6B, the external surfaces of the protrusions 343 of the linkage pieces 341 contact the inner surfaces of the depressions 344 of the other linkage pieces 341, producing a compressed position with minimal gaps between the linkage pieces 341. In this case, the linkage pieces 341 are disposed uniformly in a state in which the elastic bodies 345 are compressed.

In the compressed position in FIG. 6B, for example, when the cylinder 343 causes the shaft to float, the gaps between the linkage plats 341 open up due to the restitution forces of the elastic bodies 345, and an intermediate position results as shown in FIG. 6C. In this manner, the plurality of linkage pieces 341 are positioned at roughly equivalent spacing by the elastic bodies 345, regardless of whether the shaft of the cylinder 343 advances or retracts, or is released.

Returning to FIG. 5, the pressing position sensor 35 is a sensor for detecting the position of the moving plate 244. The pressing position sensor 35, for example, is provided for each of the pair of middle plate positioning devices 30 and comprises a light-emitting element and light-receiving element that detect whether the moving plate 244 is at a pressing position as a result of shielding of light by the moving plate 244. The pressing position is the position of the moving plate 244 at which the cells 10 in the battery cell storage apparatus 20 are pressed. The cells 10 are stored in the battery cell storage apparatus 20, and a prescribed surface pressure is applied to the cells 10 when the pressing plate 244 is pressed to the pressing position.

The holding position sensor 36 is a sensor for detecting whether the moving plate 244 is at the holding position. The holding position is the position of the moving plate 244 whereby the cells 10 in the battery cell storage apparatus 20 are held without applied pressure. The cells 10 are stored inside the battery cell storage apparatus 20, and the cells 10 are held without being pressed when the press plate 244 is pressed to the holding position.

The moving plate positioning apparatus 40 is a servo motor that is disposed in the necessary steps (B) and (D) and has a linking part 44 that allows linkage of the linking part 246 of the fixing part 24 to the distal end of the rotating shaft 42. The linking part 44, for example, fits with the linking part 246 via a depression and protrusion and transfers the rotational power from the rotating shaft 42 to the fixing part 24. The rotating shaft 42 of the moving plate positioning apparatus 40 can freely undergo forward and reverse rotation. For example, when the rotating shaft 42 undergoes forward rotation, the thread part 242 of the fixing part 24 moves inwards in the battery cell storage apparatus 20, and the moving plate 244 sandwiches the middle plates 26 and the cells 10 together with the fixing plate 248. When the rotating shaft 42 undergoes reverse rotation, the thread part 242 of the fixing part 24 moves outwards from the battery cell storage apparatus 20 and the moving plate 244 releases the middle plates 26 and the cells 10.

(Operation of the Battery Cell Storage Apparatus 20)

Next, the operation of the battery cell storage apparatus 20 will be described. The respective structural elements of the battery cell storage apparatus 20 and the like are controlled by a controller not shown in the drawings.

First, the operation of the apparatus when the middle plate positioning apparatus 30 is connected to the battery cell storage apparatus 20 in step (B) shown in FIG. 2 will be described with reference to FIG. 5, FIG. 7, and FIG. 8.

Figure 7:
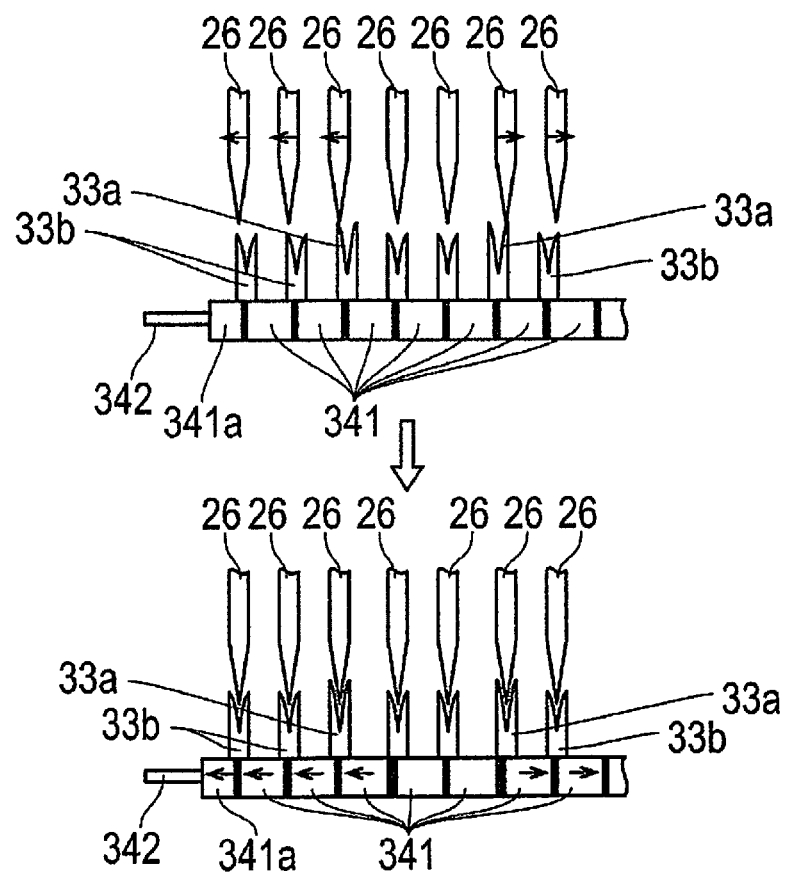
FIG. 7 is a diagram showing the guides of the middle plate positioning apparatus.

FIG. 7 is a diagram showing the guide of the middle plate positioning apparatus. FIG. 8 is a plan view showing the elements whereby the middle plate positioning apparatus and moving plate positioning apparatus are connected in the battery cell storage apparatus.

In the state shown in FIG. 5, first, the moving plate positioning apparatus 40 moves towards the battery cell storage apparatus 20 and connects to the fixing part 24. The holding position sensor 36 of the middle plate positioning apparatus 30 then determines whether the position of the moving plate 244 is at the holding position. If not at the holding position, then the rotating shaft 42 of the moving plate positioning apparatus 40 rotates, adjusting the position of the moving plate 244.

The cylinder 343 of the middle plate positioning apparatus 30 releases the shaft that connects to the linkage piece 341a, allowing the linkage piece 341a to float. As a result, the spacing of the linkage pieces 341 is freely altered.

The middle plate positioning apparatus 30 then moves close to the battery cell storage apparatus 20. When this occurs, the guides 33 move towards the middle plates 26. At this point, the positions of the middle plates 26 in the battery cell storage apparatus 20 vary due to variation in the thickness of the middle plates 26 themselves, variation in the thickness of the cells 10, and the like.

As shown in FIG. 7, when the positions of the middle plates 26 are displaced relative to the guides 33, the corresponding middle plates 26 first begin to advance into the gaps of the long guides 33a that are disposed with a spacing of a few units. The positions of the middle plates 26 are fixed, and thus when the leading end of a middle plate 26 strikes the inner wall of a guide 33a, the position of the guide 33a moves along the middle plate 26. The guide 33a is also linked to other guides 33b via the linkage pieces 341, and so, as shown in the bottom of FIG. 7, the other guides 33b move along with movement of the guides 33a. When the middle plate positioning apparatus 30 advances to approach the battery cell storage apparatus 20, the middle plates 26 begin to advance into the gaps in the guides 33b that are disposed roughly uniformly between the guides 33a that have moved. The guides 33b are thus positioned to some degree along with movement of the guides 33a, and so the middle plates 26 advance smoothly.

Figure 8:
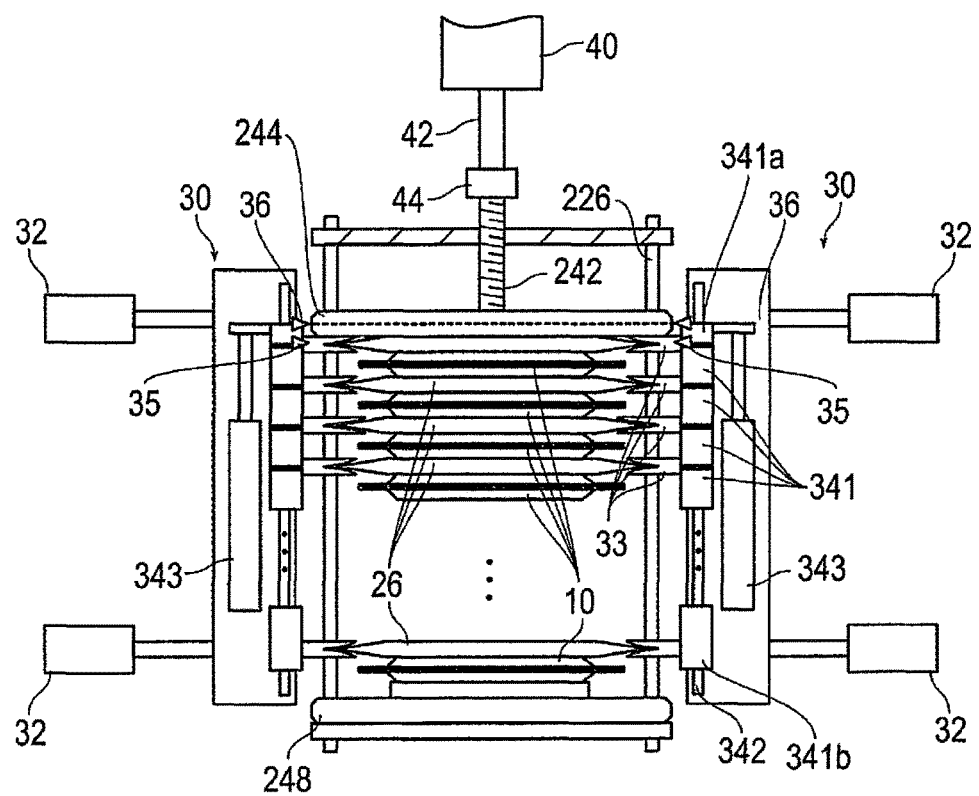
FIG. 8 is a plan view showing the elements involved in connection of the moving plate positioning apparatus and the middle plate positioning apparatus in the battery cell storage apparatus.

When all of the middle plates 26 have fit into the grooves of the guides 33, as shown in FIG. 8, a state in which the middle plates are held between the guides 33 is obtained. When this state obtains, floating of the shaft of the cylinder 343 is discontinued, the position of the guide 33 is fixed, and the position of the middle plates 26 is also fixed.

Next, the operation involving release of fixing of the cells 10 by the battery cell storage apparatus 20 in step (B) shown in FIG. 2 is described with reference to FIGS. 9 to 13.

Figure 9:
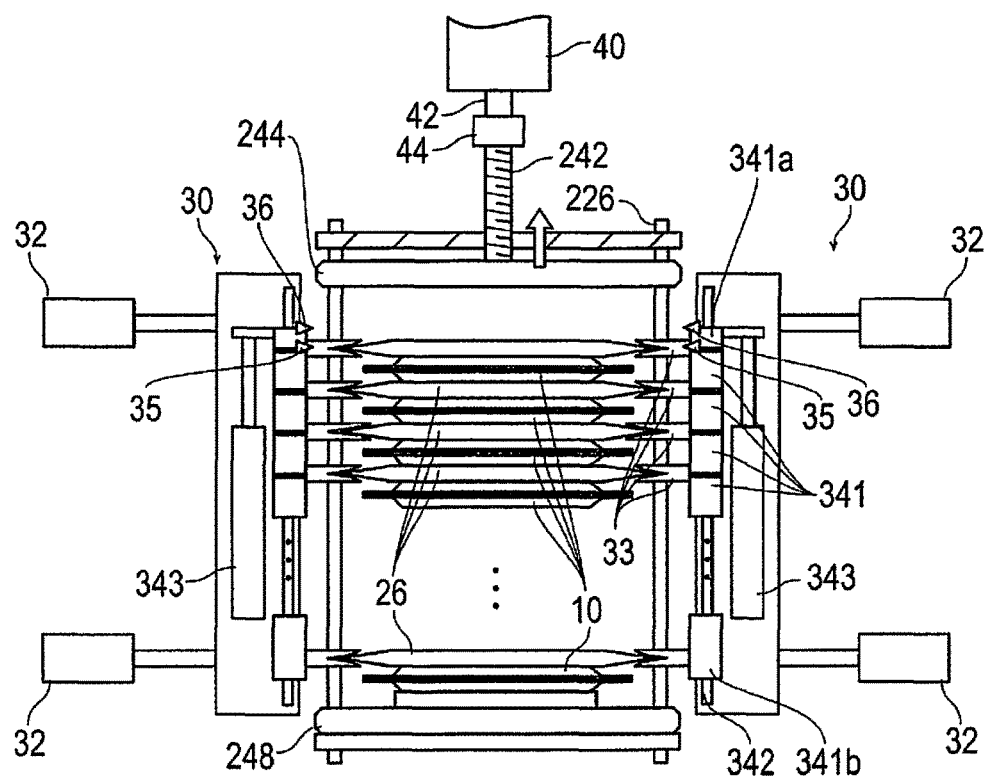
FIG. 9 is a diagram showing the elements involved in retraction of the moving plate.
Figure 10:
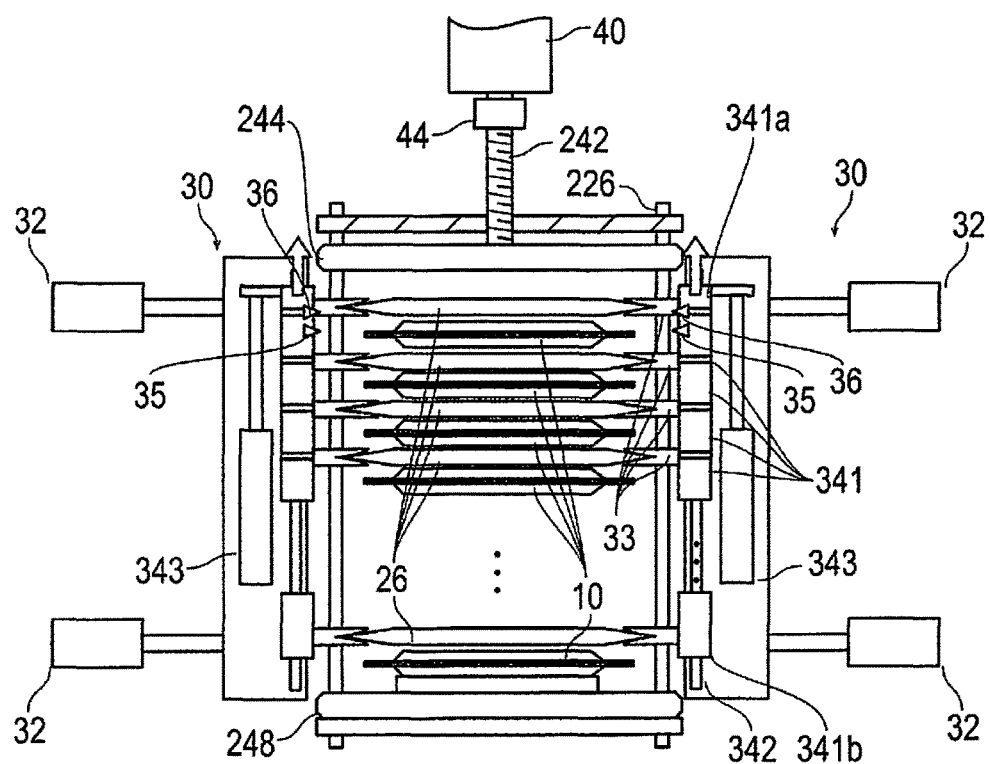
FIG. 10 is a diagram showing the elements involved in releasing the middle plates.
Figure 11:
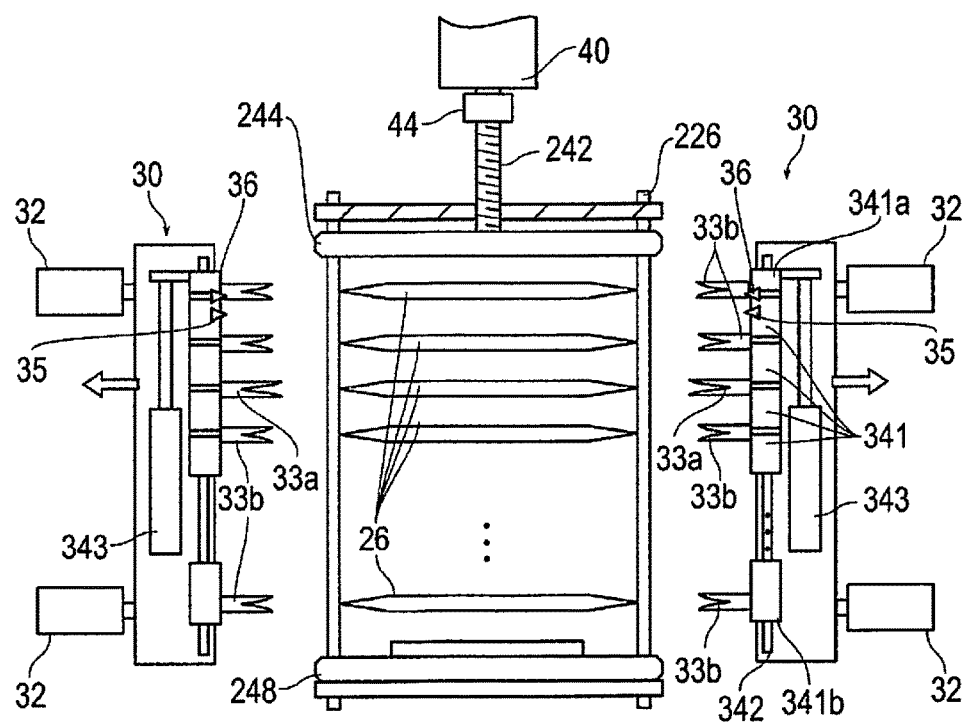
FIG. 11 is a diagram showing the elements involved in removing cells from the battery cell storage apparatus.
Figure 12:
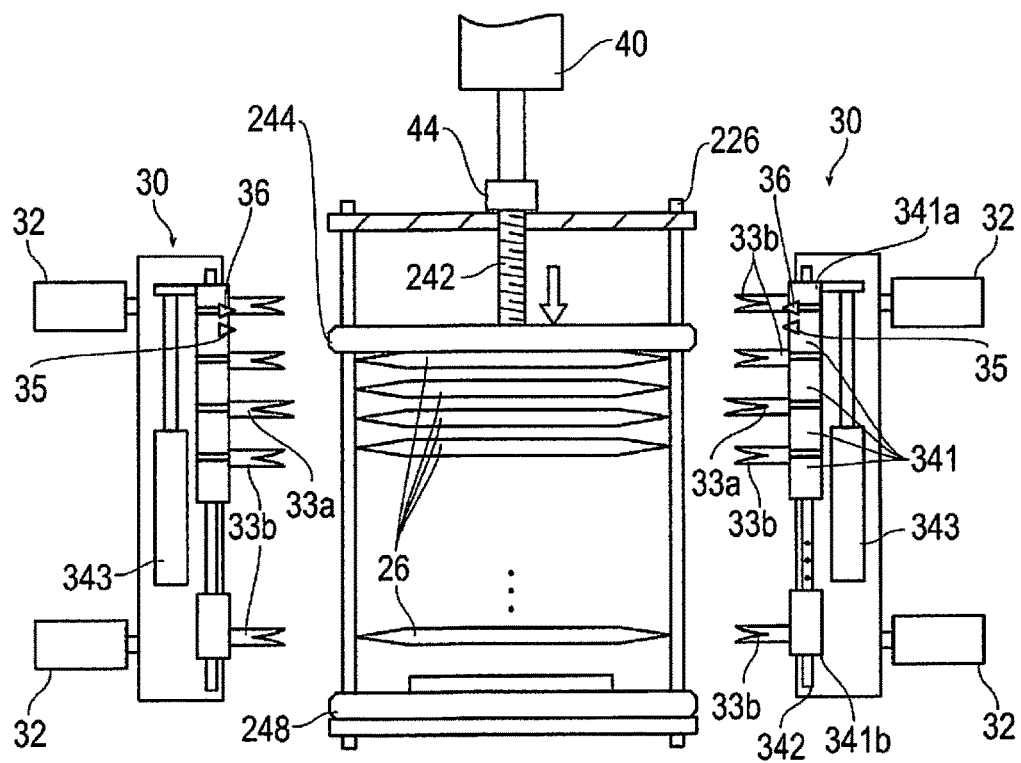
FIG. 12 is a diagram showing a state in which the middle plates in the battery cell storage apparatus are pressed while empty.
Figure 13:
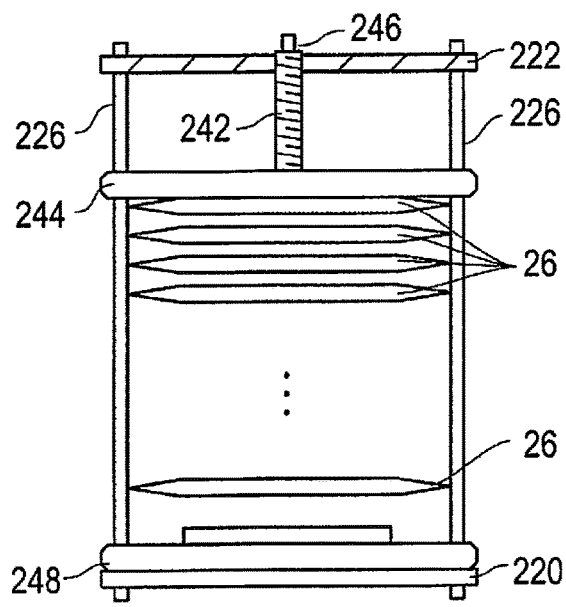
FIG. 13 is a diagram showing a battery cell storage apparatus in which cells are transported in between steps without storage.

FIG. 9 is a diagram showing the elements involved in retraction of the moving plate. FIG. 10 is a diagram showing the elements involved in release of the middle plates. FIG. 11 is a diagram showing the elements involved in removal of the cells from the battery cell storage apparatus. FIG. 12 is a diagram showing the state in which the middle plates in the battery cell storage apparatus are pressed while empty. FIG. 13 is a diagram showing a battery cell storage apparatus in which cells are transported in between steps without storage.

As shown in FIG. 9, the moving plate positioning apparatus 40 brings about rotation of the rotating shaft 42, causing the moving plate 244 in the battery cell storage apparatus 20 to move outward. Fixing of the middle plates 26 and the cells 10 is also released by the moving plate 244. However, because the moving plates 26 are fixed in position by the guide 33, the cells 10 are in a state whereby they are sandwiched between the middle plates 26.

As shown in FIG. 10, the cylinder 343 of the middle plate positioning apparatus 30 extends and widens the gaps between the linkage plats 341. The linkage pates 341 thus widen to the open position indicated in FIG. 6A. The linkage pieces 341 widen roughly uniformly due to the elastic bodies 345. Along with widening of the gaps of the linkage pieces 341, the gaps of the guides 33 also widen. Sandwiching of the cells 10 by the middle plates 26 is thereby released, and a state is produced in which the cells 10 are disposed with spaces between the middle plates 26 inside the battery cell storage apparatus 20. In this state, a robot hand enters between the middle plates 26 and removes the cells 10 inside the battery cell storage apparatus 20. The cells 10 that have been removed are transported to step (F) as desired.

When all of the cells 10 have been removed, as shown in FIG. 11, the middle plate positioning apparatus 30 is separated from the battery cell storage apparatus 20. When the middle plate positioning apparatus 30 separates, the middle plates 26 are no longer supported by the guides 33. Consequently, the middle plates 26 incline with respect to the bottom plates 224 and the through-rods 226, and are disposed in the battery cell storage apparatus 20 in a state in which the middle plates 26 are supported against each other. At this point, as shown in FIG. 12, the rotating shaft 42 of the moving plate positioning apparatus 40 rotates, and the moving plate 244 moves inwards into the battery cell storage apparatus 20. As a result, the gaps between the middle plates 26 decrease, and the play of the middle plates 26 decreases inside the battery cell storage apparatus 20. When the moving plate 244 moves to a degree whereby the play of the middle plates 26 is within a predetermined allowed range, the moving plate positioning apparatus 40 separates from the battery cell storage apparatus 20 through release of linkage of the linking part 44 with the linking part 246 of the fixing part 24. As shown in FIG. 13, the battery cell storage apparatus 20 is transported from step (B) in FIG. 2 to step (D) in an empty-pressed state in which the middle plates 26 are pushed inwards without sandwiching the cells 10.

Next, in step (D) shown in FIG. 2, the operations are described whereby the battery cell storage apparatus 20 again stores the cells 10.

Figure 14:
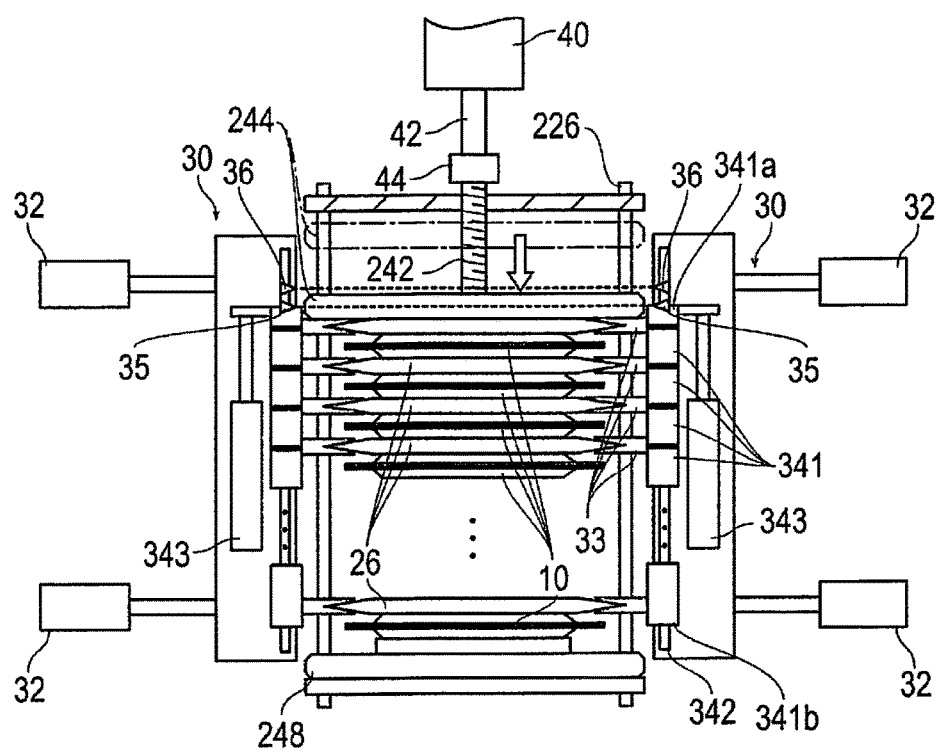
FIG. 14 is a diagram showing a state in which the cells are pressed inside the battery cell storage apparatus.

FIG. 14 is a diagram showing the state in which the cells are pressed inside the battery cell storage apparatus.

In the condition shown in FIG. 13, the middle plate positioning apparatus 30 and the moving plate positioning apparatus 40 are connected in the battery cell storage apparatus 20 that has been transported into step (D). This connection is similar to the case shown in FIG. 5. In the condition shown in FIG. 13, the cells 10 are not stored in between the middle plates 26, but, as in the case shown in FIG. 5, the middle plates 26 progressively advance into the guides 33a, 33b of the middle plate positioning apparatus 30. In the empty-pressed state, the middle plates 26 are held in the battery cell storage apparatus 20 in a state with allowed play, and so the middle plates 26 also can move in accordance with the positions of the guides 33.

When the middle plates 26 fit into the guides 33, the shaft of the cylinder 343 in the middle plate positioning apparatus 30 opens the gaps of the middle plates 26 as shown in FIG. 10. The cells 10 that have been roll-pressed are then sequentially stored in between the middle plates 26 by the hand of a robot.

When all of the cells 10 have been stored in the battery cell storage apparatus 20, the middle plate positioning apparatus 30 separates from the battery cell storage apparatus 20. The rotating shaft 42 of the moving plate positioning apparatus 40 then rotates and the moving plate 244 is pressed in. At this point, as shown in FIG. 14, the moving plate 244 is pressed in until the position is detected by the pressing position sensor 35. As a result, a prescribed surface pressure is applied to the cells 10 in between the middle plates 26.

The moving plate positioning apparatus 40 separates from the battery cell storage apparatus 20, and the battery cell storage apparatus 20 is transported to step (E) and subsequent steps.

As described above, the following effects result from the battery cell storage apparatus 20, the middle plate positioning apparatus 30, and the moving plate positioning apparatus 40 in this embodiment.

In accordance with the battery cell storage apparatus 20, the cells 10 can be disposed between the middle plates 26, and the flat faces of the flat cells 10 can thus be supported by the middle plates 26. Because the cells 10 are supported by the flat faces, the loads on the edges of the external packaging of the cells 10 can be decreased, making it possible to prevent damage to the ends of the cells 10.

In addition, because a configuration is used in which the distance between the guides 33 can be varied, by increasing the distance between the guides 33, the spacing of the middle plates 26 is also increased, which facilitates removal and storage of the cells 10.

Because fixing of the middle plates 26 and the cells 10 by the moving plate 244 of the fixing part 24 is released prior to removal of the cells 10 from the battery cell storage apparatus 20, the spacing of the guides 33 is increased, and removal of the cells 10 is facilitated. On the other hand, after the cells 10 are stored in the battery cell storage apparatus 20, the cells 10 can be fixed or pressed by the moving plate 244 of the fixing part 24. When pressed, the cells 10 can be transported connected to a charge-discharge apparatus not shown in the drawings in the pressed state, and the cells 10 thus can be charged and discharged under the same conditions as when they are to be actually used.

In particular, in step (D), the cells 10 that have been through the roll-pressing step (F) are stored in the battery cell storage apparatus 20, the moving plate 244 is pressed in to the pressing position, and a predetermined surface pressure is applied to the cells 10. In subsequent steps, the cells can be transported by the battery cell storage apparatus 20 while being pressed by the moving plate 244. Consequently, even in subsequent steps involving charging or discharging of the cells 10, if the cells 10 are pressed by the battery cell storage apparatus 20, then appropriate charge/discharge conditions are produced, and it becomes unnecessary to provide an apparatus for applying pressure to the cells 10, thereby reducing the cost of production equipment.

After the cells 10 and the middle plates 26 have been fixed by the moving plate 244 of the fixing part 24, the cells 10 are tightly sandwiched between the middle plates 26. Consequently even if holding of the middle plates 26 by the guides 33 is released by separating the middle plate positioning apparatus 30, the cells 10 can be transported without play by the middle plats 26 and the fixing part 24 alone. Alternatively, the middle plate positioning apparatus 30 can be separated after removing all of the cells 10 from the battery cell storage apparatus 20. The middle plate positioning apparatus 30 is separated from the battery cell storage apparatus 20 at the time of transport of the battery cell storage apparatus 20 between steps, and so transport of the battery cell storage apparatus 20 as a single unit can be carried out while it is light.

When the guides 33 hold the middle plates 26, the ends of the middle plates 26 start to progress inwards from the extended portions of the gaps of the guides 33, and so positional alignment of the guides 33 and the middle plates 26 is easy. The middle plates 26 that have inserted into the extended gaps of the guides 33 are smoothly guided, in a relative manner, into the narrow portions of the gaps and are fixed.

In addition, when the middle plates 26 are held by the guides 33, the middle plates 26 first begin to insert into the guides 33a, and the guides 33a are positioned relative to the positions of the middle plates 26 naturally during insertion. The remaining guides 33b also undergo positional movement in connection with positioning of the guides 33a, and the remaining middle plates 26 can be reliably inserted.

In addition, as shown in FIG. 2, in step (B) prior to step (F) of roll-pressing, the cells 10 are removed from the battery cell storage apparatus 20, and in step (D) after step (F) of roll-pressing, the cells 10 are stored in the battery cell storage apparatus 20. In step (F) of roll-pressing, the cells 10 are adjusted for transport and processing, and the battery cell storage apparatus 20 is transported by the transport apparatus 80. Thus, removal and storage of the cells 10 before and after the roll-pressing step (F) can be carried out smoothly.

In the embodiment described above, a case was described in which the cells 10 were transported before and after the roll-pressing step. However, the invention is not limited thereto. The invention may be utilized in any equipment, provided that the equipment involves storage and transport of the cells 10 in the battery cell storage apparatus 20.

The invention claimed is:

1. A battery cell transport system for removing a battery cell stored in a battery cell storage apparatus, the battery cell storage apparatus comprising:
    a plurality of sheet-formed middle plates;
    a fixing member configured to fix the battery cell stored between the sheet-formed middle plates by sandwiching the battery cell together with the sheet-formed middle plates;
    a plurality of middle plate holding members, each middle plate holding member of the plurality of middle plate holding members configured to hold a respective sheet-formed middle plate of the plurality of sheet-formed middle plates; and
    a device configured to move the plurality of middle plate holding members toward and away from the sheet-formed middle plates such that the plurality of middle plate holding members are configured to detachably hold the sheet-formed middle plates,
    wherein the fixing member is movable such that as a distance between each of the sheet-formed middle plates is widened and the plurality of middle plate holding members are detached from the sheet-formed middle plates, the battery cell can be removed from the battery cell storage apparatus.

2. The battery cell transport system according to claim 1, wherein
the plurality of middle plate holding members are linked so that a distance between each of the sheet-formed middle plates can be changed in an arrangement direction of the sheet-formed middle plates.

3. The battery cell transport system according to claim 2, wherein
the fixing member is configured to perform a releasing operation in which the sandwiching of the sheet-formed middle plates and the battery cell is released prior to removal of the battery cell, enabling a distance between the plurality of middle plate holding members in which the plurality of sheet-formed middle plates are held to be widened, and, after storage of the battery cell, the fixing member is configured to perform a pressing operation in which the sheet-formed middle plates and the battery cell are sandwiched while being pressed.

4. The battery cell transport system according to claim 3, wherein
the fixing member is configured to perform the releasing operation prior to roll-pressing of the battery cell by rollers, and to perform the pressing operation after roll-pressing.

5. The battery cell transport system according to claim 1, wherein
the plurality of middle plate holding members are configured to release the sheet-formed middle plates.

6. The battery cell transport system according to claim 5, wherein
the plurality of middle plate holding members have gaps between adjacent middle plate holding members extending towards each of the middle plates, and the sheet-formed middle plates are held in the gaps.

7. The battery cell transport system according to claim 6, wherein
the plurality of middle plate holding members include first plate holding members protruding towards the middle plates a first distance, and second holding members protruding towards the middle plates a second distance, the second distance being less than or equal to the first distance.

8. The battery cell transport system according to claim 4, further comprising:
a transport apparatus configured to transport the battery cell storage apparatus from before to after the roll-pressing of the battery cell,
the battery cell transport system being configured to remove the battery cell prior to the roll-pressing,
the transport apparatus being configured to transport the battery cell storage apparatus during the roll-pressing, and
the battery cell storage apparatus being configured to store the battery cell after the roll-pressing.

9. The battery cell transport system according to claim 2, wherein
the plurality of middle plate holding members are configured to release the sheet-formed middle plates.

10. The battery cell transport system according to claim 3, wherein
the plurality of middle plate holding members are configured to release the sheet-formed middle plates.

11. The battery cell transport system according to claim 4, wherein
the plurality of middle plate holding members are configured to release the sheet-formed middle plates.

12. The battery cell transport system according to claim 1, wherein
each of the plurality of middle plate holding members is movable in a direction substantially perpendicular to the direction of alignment.

13. The battery cell transport system according to claim 1, wherein
a transverse location of each of the plurality of sheet-formed middle plates is restricted by through-rods disposed at opposite ends of each of the plurality of sheet-formed middle plates.

* * * * *